Patented Nov. 15, 1938

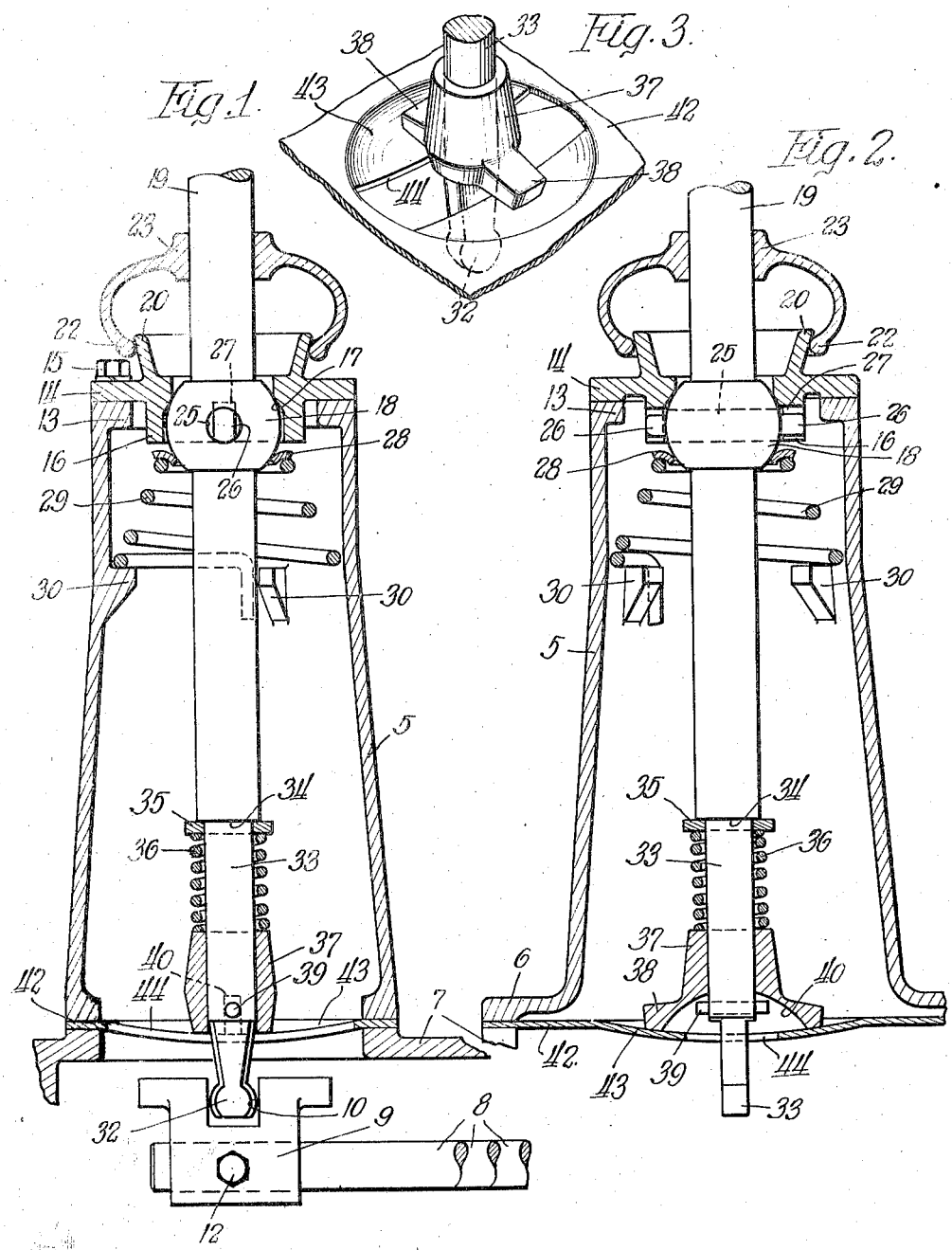

2,136,697

UNITED STATES PATENT OFFICE 2,136,697

SHIFTING MEANS FOR TRANSMISSIONS

Robert Lapsley, Berrien Springs, Mich., assignor to Clark Equipment Company, Buchanan, Mich., a corporation of Michigan Application April 17, 1936, Serial No. 74,949

9 Claims. (Cl. 74—473)

This invention relates to shifting means for transmissions and the like, and is more particularly directed to means for dampening vibrations of a gear shift lever with respect to the shifter rods in the transmission.

It has become the practice to construct certain types of trucks in such manner that the driver's cab is mounted directly over the engine, whereby the driver is seated above and considerably forwardly of the transmission housing interposed between the driving shaft of the engine and the propeller shaft leading to the drive axle. In such cases, the gear shift lever for the transmission must be extended upwardly and forwardly into the driver's compartment resulting in a relatively long overhang of the upper portion of the gear shift lever with respect to the portion of the pivotal mounting which engages the shifter rods. Due to this overhang, a considerable amount of vibration is produced in the lever which has a tendency to result in undue wear between the shifter knob at the opposite end of the lever and the shifter forks on the shift rods.

The present invention has for its primary object the provision of means which serves to prevent any substantial vibration of the transmission end of the gear shift lever and to hold it in any shifted position by frictional pressure engagement between a portion of the lever and the supporting housing. This results in holding the inner end of the lever against vibration which results in also steadying the overhanging portion of the lever extending into the driver's compartment. Another object of the invention is to produce in such a construction a pivotal mounting for the shift lever which will provide increased bearing surfaces to prevent undue wear about the portion of the lever that is supported for universal movement.

Another advantage secured by the present construction is the elongation of the inner portion of the lever below its pivotal support whereby even with a relatively long overhanging extension on the lever only a relatively small degree of movement in the driver's compartment will result in the desired shifting action at the transmission.

Other objects and advantages of the present invention will appear more fully from the following detailed description, which taken in conjunction with the accompanying drawing, will disclose to those skilled in the art, the construction and operation of a preferred form of the present invention.

In the drawing:

Figure 1 is a vertical sectional view through a preferred form of the present invention;

Figure 2 is a sectional view taken substantially through the mid-plane of Figure 1; and Figure 3 is a perspective view of the vibration dampening mechanism incorporated in the present construction.

Referring now in detail to the drawing, I have provided a substantially tubular supporting housing 5 having at its lower end a flange 6 which secures the housing to the top surface of a transmission housing 7.

Mounted in the housing 7 are the usual shifter rods 8 for effecting selection of the various gear ratios through the transmission. Each of these rods is provided with a shifter fork 9 of conventional design having the recess 10 therein and secured to the rods 8 in any usual manner as by the bolt 12.

The upper end of the housing 5 is provided with an inturned flange 13, the upper surface of which receives the top plate 14 which is secured thereto by a plurality of circumferentially spaced studs 15. The top plate 14 is provided with a downwardly extending flange 16 having an internal opening forming a socket 17 receiving the enlarged ball portion 18 of a gear shift member or lever 19.

An outwardly flared flange 20 is provided on the cap member to receive the peripheral edge 22 of a closure member 23 which engages about the lateral surface of the lever 19 above the top plate 14. The member 23 preferably is made of a resilient material that will accommodate movement of the lever 19 and will seal the extending portion of the lever against escapage of lubricant from the housing 5.

A suitable pin member 25 extends transversely through the ball portion 18 of the lever 19 and has the projecting ends 26 thereof flattened for engagement in rectangular slots 27 cut into the flange 16 of the top plate 14. It is to be pointed out that by this arrangement I am able to accurately machine the slots 27 in the flange 16 prior to mounting of the top plate on the housing 5. This is of distinct advantage and provides for proper alinement and bearing of the pin 25 in these slots. It will be noted that the ball 18 is sealed outwardly of the bearing slots 27 against the defining edge of the socket 17. This insures proper lubrication of the pin in the slots while preventing escape of lubricant outwardly around the ball portion 18 of the lever.

A suitable spring follower 28 engages about the lower portion of the ball 18 of the lever 19 and is pressed upwardly by means of the helically coiled spring 29 which engages the follower 28, and at its opposite end is biased against suitable supporting shoulders 30 formed in the interior of the housing 5.

The lever 19 extends downwardly from the ball portion 18 through the housing 5 into the transmission housing 7, being provided at its lower end with a shifter knob 32 which is adapted to have selective engagement in the various shifter forks carried by the corresponding shifter rods 8. The reduced portion 33 of the lever forms a shoulder 34 which is adapted to form a stop for the washer 35 pressed thereagainst by means of the spring 36, encircling the reduced portion of the lever. At its opposite end, the spring 36 is biased against a sleeve member 37 which is reamed for sliding engagement on the reduced portion 33 of the lever. The member 37 has its lower surface formed as a section of a sphere and is provided with extending portions 38 disposed laterally outwardly of the lever. The reduced portion 33 of the lever is provided adjacent the lower end of the member 37 with a transverse pin 39 disposed in a semi-circular keyway or groove 40 formed in the under surface of the member 37. A plate 42 is secured between the flange 6 and the upper face of the transmission housing 7. The member 42 has a downwardly dished spherical section 43 which is provided with an arcuate rectangular slot 44 accommodating rocking movement of the lever 19 about the ball 18 to effect selective engagement of the shifter knob 32 in any desired shifter fork 9 and also accommodates backward and forward movement of the knob 32 to effect axial movement of the selected shift rod. During all such movements, the under surface of the member 37 has frictional pressure engagement with the upper surface of the dished portion 43 of the plate 42, being held thereagainst by the spring 36. This results in a resilient dampening action whereby the shifter knob 32 is held against any substantial vibration by reason of the pressure engagement of the member 37 on the plate 42. This counteracts the vibration produced in the lower end of the shift rod due to the long overhang of the projecting portion of the lever. At the same time, it assures that the knob 32 will not wear within the recesses 10 to an extent such as to jeopardize proper shifting of the shift rods 8.

The housing 5 is somewhat elongated and the portion of the lever from the ball 18 to the knob 32 is correspondingly elongated in order to increase the arcuate movement of the knob 32 with respect to a predetermined movement of the outer projecting end of the lever 19, whereby this end need not be moved in as great an arc as would ordinarily be required in order to effect shifting.

It will therefore be apparent that I have provided a shifting arrangement capable of eliminating any substantial vibration of the gear shift lever, and capable of mounting the lever in such manner as to decrease the wear caused by movement of an elongated type of shifting mechanism.

I am aware that various changes in the details of the various constituent elements of the present invention may be made without departing from the underlying principles of the invention. I therefore do not intend to be limited except as defined by the scope and spirit of the appended claims.

I claim:

1. In combination, a gear shift lever, a supporting housing, a ball and socket connection between said lever and housing, a dished closure plate across one end of said housing, one portion of said lever extending through said plate, and means slidably mounted on said lever within said housing and biased between said extending portion of said lever and said plate for preventing substantial vibration of said extending portion.

2. Means for preventing vibration of the transmission-engaging end of a gear shift lever comprising a sleeve member encircling said end of said lever and normally urged outwardly thereof, an apertured plate through which said end extends serving as a bearing surface with which said sleeve member has frictional pressure engagement, and means for retaining said sleeve member in position on said lever against said spring pressure during assembly of said lever with respect to said plate.

3. In combination, a pivotally mounted gear shift lever, a plate member through which one end of said lever extends apertured to accommodate shifting movement of said lever, said plate having a spherical dished portion whose center of curvature is the pivotal support for said lever, and a sleeve member on said lever and having a corresponding convex spherical bearing surface engaging the plate member about said aperture, said sleeve member being urged into frictional engagement with the concave surface of said member.

4. In combination, shifting means comprising a supporting housing closed at its opposite ends, a gear shift lever supported intermediate its ends for substantially universal movement with respect to one end of said housing, said lever extending through the opposite end of said housing into a transmission case, and spring pressed means on said lever adjacent to and frictionally engaging said opposite end of said housing substantially preventing vibration of said lever with respect to said opposite end of said housing.

5. In combination, shifting means comprising a supporting housing, a gear shift lever supported intermediate its ends for substantially universal movement with respect to one end of said housing, a dished member at the opposite end of said housing apertured to receive one end of said lever, and means slidably mounted on said lever adjacent said end thereof and having pressure engagement with said dished member to dampen vibrations of said end of said lever.

6. In combination, a gear shift lever having a ball portion intermediate its ends, a housing enclosing a portion of said lever and having a socket portion receiving said ball portion, a transverse pin in said ball portion having flatted projecting ends, rectangular bearing slots receiving said ends, a dished plate closing one end of said housing and apertured to accommodate shifting movement of the enclosed portion of said lever, and sleeve means slidably mounted on said lever within said housing and terminating in a convex portion having resilient pressure engagement with said plate for dampening vibration of the lever.

7. In combination, a transmission housing, a tubular housing extending vertically therefrom, a plate secured between said housings and having a rectangular aperture therein, a gear shift lever mounted for universal movement in the upper end of said tubular housing and having one end extending through said plate into said transmission housing, and means resiliently supported for sliding movement on said lever within said tubular housing and having frictional pressure engagement with the surface of said plate about said aperture.

8. In combination, a transmission housing, a gear shift lever having a ball portion intermediate its ends, a supporting housing enclosing a portion of said lever and including a downwardly opening socket receiving said ball portion, an apertured plate secured between said housings through which one end of said lever extends, and means biased between said lever and the top surface of said plate and between said supporting housing and the lower surface of said ball portion for resiliently maintaining said lever against downward displacement from said socket.

9. In combination, a transmission housing, a second housing supported thereon, an apertured plate between said housings, a top plate for said second housing having a downwardly opening bearing socket, a gear shift lever having a ball portion intermediate its ends disposed in said bearing socket, one end of said lever extending through said apertured plate into said transmission housing, spring means normally urging said ball portion of said lever upwardly against said socket, a friction shoe axially movable on said lever and bearing against the upper surface of said apertured plate, independent means between said lever and said shoe urging said shoe against said plate, said lever being held against downward movement solely by said spring means and said independent means.

ROBERT LAPSLEY.